(12) United States Patent
Ducret

(10) Patent No.: US 9,748,748 B2
(45) Date of Patent: Aug. 29, 2017

(54) CABLE STRIPPER

(75) Inventor: Lucien C. Ducret, Stamford, CT (US)

(73) Assignee: Southwire Company, LLC, Carrollton, GA (US)

( * ) Notice: Subject to any disclaimer, the term of this patent is extended or adjusted under 35 U.S.C. 154(b) by 199 days.

(21) Appl. No.: 13/136,928

(22) Filed: Aug. 16, 2011

(65) Prior Publication Data

US 2013/0042483 A1    Feb. 21, 2013

(51) Int. Cl.
*H02G 1/12*    (2006.01)

(52) U.S. Cl.
CPC ................................ *H02G 1/1229* (2013.01)

(58) Field of Classification Search
CPC .................................................. H02G 1/1229
USPC ..................... 30/90.1, 90.4, 90.6, 90.7, 90.8
See application file for complete search history.

(56) References Cited

U.S. PATENT DOCUMENTS

| | | | |
|---|---|---|---|
| 2,346,227 A | 4/1944 | Martin et al. | |
| 2,778,105 A | 1/1957 | Carta | |
| 3,665,603 A | 5/1972 | Bilbrey | |
| 3,826,001 A * | 7/1974 | Bilbrey | H02G 1/1226 30/142 |
| 4,489,490 A * | 12/1984 | Michaels et al. | 30/90.1 |
| 5,301,426 A * | 4/1994 | Regan | 30/90.9 |
| 5,487,220 A * | 1/1996 | Saitou | 30/90.6 |
| 5,809,652 A | 9/1998 | Ducret | |
| 6,073,349 A * | 6/2000 | Liversidge | 30/90.7 |
| 6,308,417 B1 * | 10/2001 | Ducret | 30/90.7 |
| 2004/0055160 A1 * | 3/2004 | Ducret | 30/90.1 |
| 2013/0042483 A1 * | 2/2013 | Ducret | H02G 1/1229 30/90.7 |

\* cited by examiner

*Primary Examiner* — Hwei C Payer
(74) *Attorney, Agent, or Firm* — Eric J. Sosenko; Jonathan P. O'Brien; Honigman Miller Schwartz and Cohn LLP

(57) ABSTRACT

A blade stripper has a displaceable blade carriage, which is normally biased toward a cable support to automatically accommodate differently dimensioned jacketed cables in a desired position. The blade carriage supports a blade assembly configured so that the blade can be displaced among multiple positions corresponding to respective axial, radial and a plurality of spiral cuts while the cable is engaged in the desired position.

22 Claims, 2 Drawing Sheets

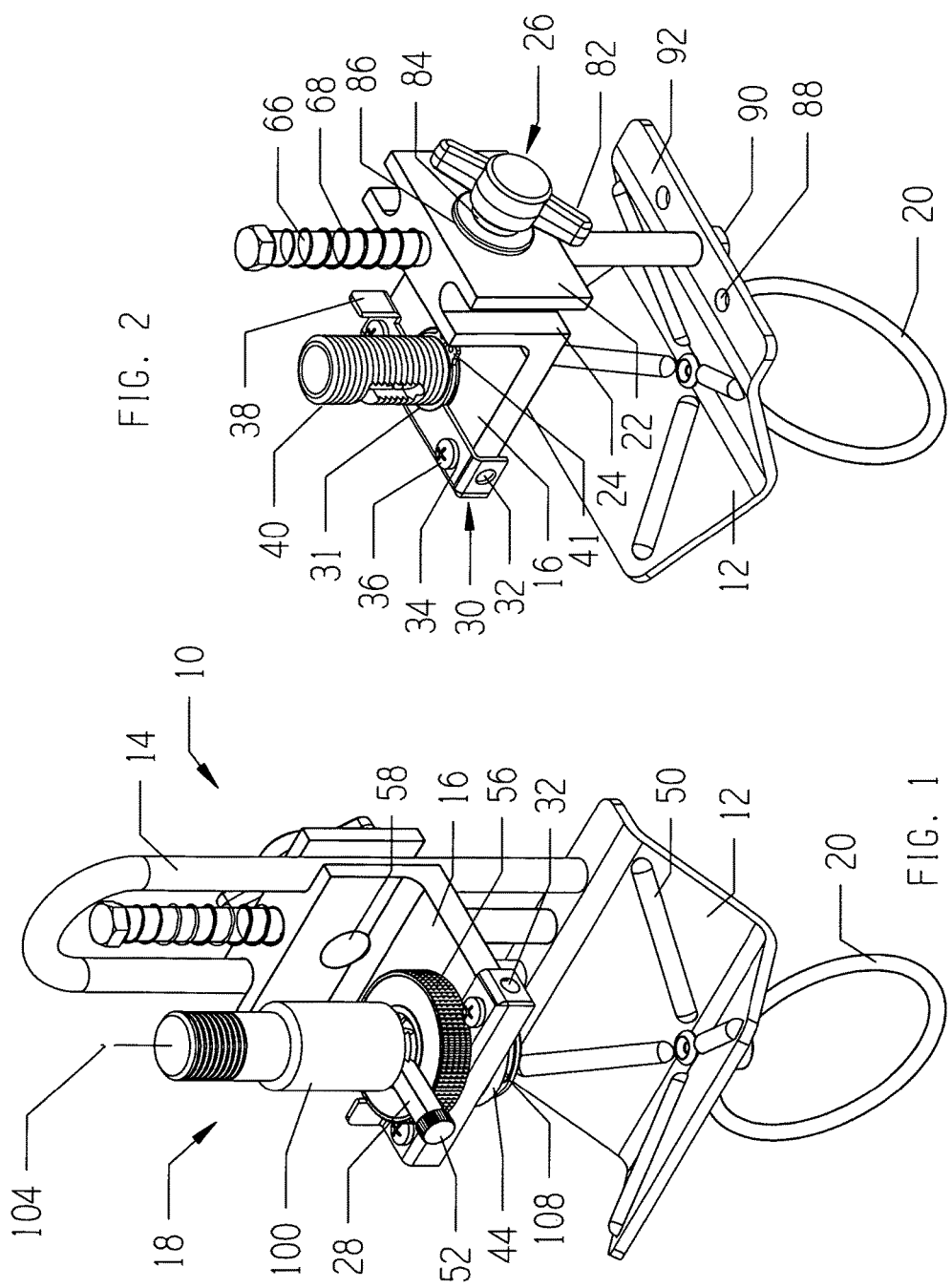

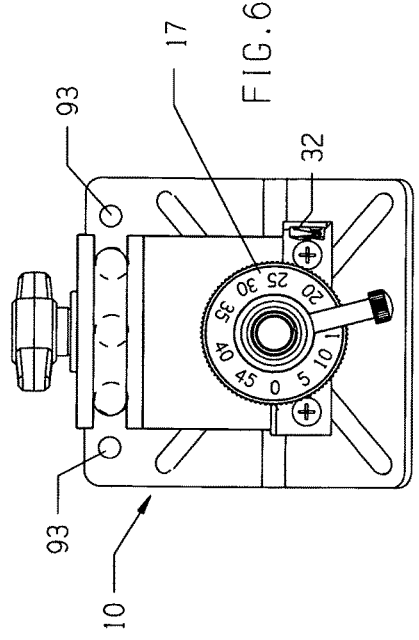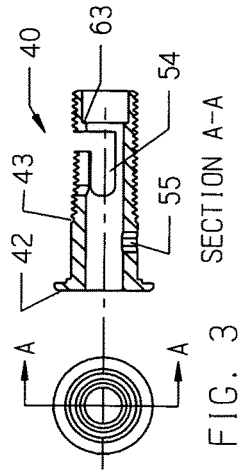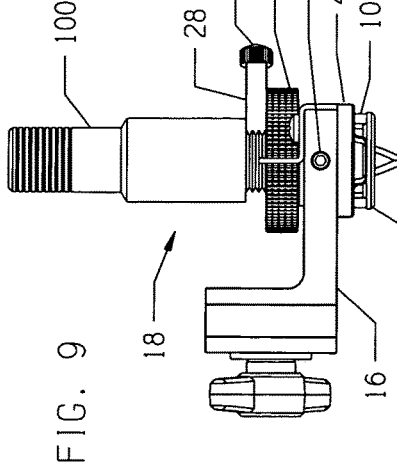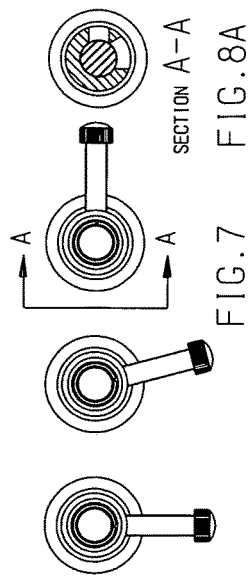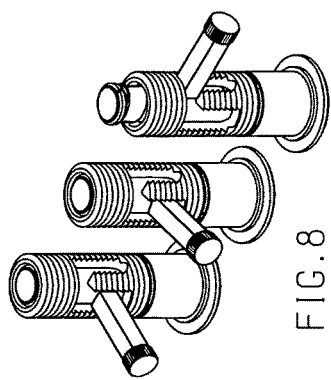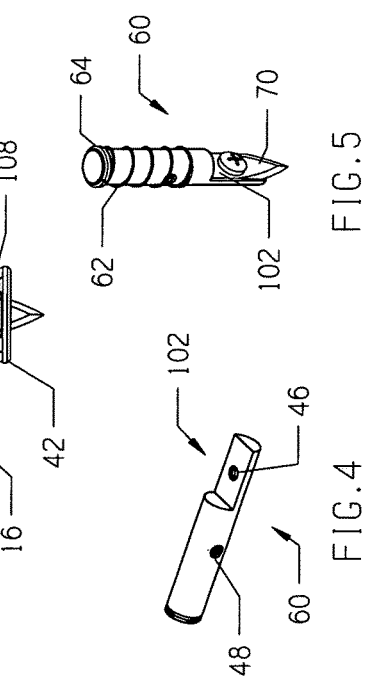

CABLE STRIPPER

U.S. Pat. No. 6,308,417 (US '417), which is commonly owned with the present application and incorporated herein by reference, discloses a cable stripper operative to accommodate a great variety of differently-dimensioned cables. However, the cable stripper disclosed in this patent has a complex structure associated with a relatively high manufacturing cost.

BACKGROUND OF THE INVENTION

1. Field of the Invention

The invention relates to cutting tools, and in particular, to a portable cable stripper automatically adjustable so as to accommodate differently dimensioned jacketed cables.

2. Background of Technological Field

U.S. Patent Application Publication No. 2004/0055160 ('160), like US '417, is commonly owned with this present application and discloses a cable stripper operative to provide jacket stripping for differently dimensioned cables. The configuration of the disclosed cable stripper is relatively simple and allows for an axial cut, i.e., along a cable, and a radio cut. The configuration further allows for a spiral cut of the cable. However the spiral cut can be realized only by first dismounting the stripper from the cable to be processed and then fully disassembling the tool in order to manually displace the blade in the desired position. The disclosed cable stripper, thus, is inconvenient for producing a spiral cut and contradicts one of the advantages of this tool, i.e. its capability of changing the angular position of the blade without disengaging the cable stripper from the cable to be processed.

U.S. patent application Ser. No. 10/253,101[1] (PA '101), like US '417, is commonly owned with this application and discloses a cable stripper operative to provide jacket stripping for differently dimensioned cables. The configuration of the disclosed cable stripper is relatively simple and allows for an axial cut, i.e., along a cable, and a radial cut. The configuration further allows for a spiral cut of cable. However the spiral cut can be realized only by first dismounting the stripper from the cable to be processed and then fully disassembling the tool in order to manually displace the blade in the desired position. The disclosed cable stripper, thus, is inconvenient for producing a spiral cut and contradicts one of the advantages of this tool, i.e. its capability of changing the angular position of the blade without disengaging the cable stripper from the cable to be processed.

It is, therefore, desirable to provide a cable stripper having a simple structure allowing for providing axial, radial and spiral cuts in a simple and efficient manner.

SUMMARY OF THE INVENTION

The disclosed portable cable stripper has a simple configuration allowing for a spiral cut in a simple manner which does not require the disassembly of the entire tool The cable stripper is configured with a blade assembly slidable along a device axis at a distance corresponding to the desired depth of penetration of the cable stripper's blade into the cable to be processed. The blade assembly includes a blade holder received in a blade housing which, in turn, is surrounded by a blade cap so that all three components are coaxially disposed.

The blade housing is structured with a U-shaped guide pocket having two side channels separated from one another by a a third channel that bridges the side channels. The pocket is traversed by a lever fixed to the blade holder and guided along all channels by the operator so as to displace the blade in the desired extreme positions corresponding to respective axial and radial cuts.

At least one of the side channels is shaped and dimensioned to allow the blade to move radially to a position in which the blade is located between two extreme positions. Such a position would allow for a spiral cut. Moreover, an angle at which the blade is angularly displaced can be monitored.

BRIEF DESCRIPTION OF THE DRAWINGS

The disclosed tool will become more readily apparent when reference is made to the following description taken in conjunction with the accompanying drawings, in which:

FIG. 1 is an isometric view of the cable stripper in accordance with the present invention.

FIG. 2 is an isometric view a portion of the inventive cable stripper illustrating cable guide and blade carriage assemblies.

FIG. 3 is an isometric view of a blade housing.

FIG. 4 is an isometric view of a blade holder.

FIG. 5 is an isometric view of the blade assembly having a biasing component in a relaxed state.

FIG. 6 is a top view of the disclosed cable stripper of FIGS. 1 and 2.

FIG. 7 illustrates numerous positions of the blade corresponding to radial, spiral and axial cuts.

FIG. 8 illustrates three isometric views corresponding to the position of the blade as shown in FIG. 7.

FIG. 8A is a cross section of recess provided in a blade assembly for guiding the blade to the desirable angular position corresponding to one of axial, radial or spiral cut.

FIG. 9 is a left side view of the blade assembly and a carriage supporting the former and displaceable along the disclosed cable stripper at the desired depth of the blade's penetration.

SPECIFIC DESCRIPTION

Referring to FIGS. 1-2, a portable cable stripper 10 includes a V-shaped cable support 12 for receiving a cable to be stripped, a guide column 14 removably attached to cable support 12, a blade-holding carriage 16 slidable along guide column 14 and a guide assembly including a handle 20, which is attached to an outer side of the cable support.

The portable cable stripper is a labor-saving tool adjustable to remove jackets from rigid fiber optic and plastic jacketed cables having an outer diameter which may vary from about {fraction (3/16)}" to 2". In operation, the user initially sets the desired depth at which a blade penetrates the jacket of the cable. Following it, the blade carriage 16 is pulled outwards from the V-shaped cable support 12 to form a space sufficient to receive the cable. Once the cable is placed on the cable support, blade carriage 16 slides towards and presses against the periphery of the jacket under the spring force so that the cable is locked between cable support 12 and blade carriage 16.

In accordance with the disclosure, a blade may be adjusted to provide longitudinal, radial and spiral cuts through the jacket of the clamped cable, Similarly to the cable stripper of '160, commonly owned with the present application, the cable to be processed remains clamped while, for example, the blade is displaced from a position corresponding to the axial cut to a position corresponding to the radial cut. In contrast to '160, the cable may be clamped while the blade is displaced to the desired angular position corresponding to a spiral cut which can be realized by a blade assembly 18. (FIG. 9) U.S. patent application Ser. No. 10/253,101

Referring to FIGS. 2, 4 and 5, blade assembly 18 includes, among others, a hollow blade housing 40 (FIG. 2), a blade holder 60 (FIG. 4) supporting a blade 70 (FIG. 5) which is removably attached to holder 60 by a screw engaging a threaded recess 46 (FIG. 4) in the holder. The blade housing 40 (FIG. 2) extends through an opening formed in blade carriage 16 and has a hollow interior receiving the blade holder 60 which is sized to controllably rotate within the blade housing, as will be explained below. The periphery of the blade housing 40 is threaded to mesh with a threaded inner surface of a blade cap 100 (FIG. 1), which also acts as a lock.

A U-shaped guide pocket (FIGS. 2, 3 and 8) formed in the peripheral wall of the blade housing 40 provides a guide channel for a lever 28 (FIGS. 1 and 7), which is removably fixed to blade holder 60 (FIG. 4) my a thumb-screw 52 (FIG. 1, 9) engaging a hole 48 of blade holder 60 (FIG. 4). Displacing lever 28 between two side channels (FIGS. 3&8) causes the blade to turn at 90° from, for example, the axial cut position to the position of the radial cut. At least one of side channel, for instance side channel 54, is configured so that lever 28 is operative to angularly move within it at an angle smaller than 90 degrees. Preferably, channel 54 has a frustrated conical shape widening toward the bottom thereof, which may be curved or flat. The displacement of the blade may be controllable, i.e., a scale 17 (FIG. 6) indicates angle at which the blade 70 (FIG. 5) is displaced from the extreme position. Once the desired angle, for example, 5, 10 or 15 degrees, is established, and with dial 56 preadjusted to the proper blade penetration matching the cable jacket size, cap lock 100 (FIG. 1) is tightened over lever 28 (FIG. 9). As a result, blade holder 60 (FIG. 5) is adjusted to penetrate the cable's jacket at the desired angle. A plurality of holes 93 (FIG. 6) are provided to secure the stripper to a bench.

Returning to FIGS. 1 and 2, displacement of the carriage 16 toward the cable to be stripped is caused by a spring 68 mounted on a central post 66, better shown in FIG. 2, and biasing the blade carriage towards cable support 12. The post 66 is removably mounted on one side of the cable support and traverses a central hole formed in a flange 22 of carriage 16, which, thus, has an L-shape. The post further has a thickened outer end configured to form a seat for the outer end of spring 68, the opposite end of which urges against flange 22 of the blade guide so as to push the latter towards the cable placed on the cable support.

The desired axial position of carriage 16 can be registered by a carriage lock 26 provided with a screw 84 and washer 86, which are actuated by a handle 82 so that the screw 84 engages a threaded portion of locking cylinder 58 (FIG. 1). The desired position is ensured when the locking cylinder 58 is pulled against the central post 66.

The guide recesses 24 formed on the opposite sides of the flange 22 provide linear displacement of the blade carriage in a plane perpendicular to a tangent to the periphery of a circular cable. Preferably, the bottoms of the guide recesses 24 each have a respective surface extending complementary to a peripheral surface of the side posts of the guide column 14, which are, as shown in FIG. 1, are tubular. However, the cross-section of the posts is not limited to any particular configuration and may be, for example, polygonal.

The assembly of the cable stripper 10 is simplified by attaching inner ends of the side posts of the guide column 14 (FIG. 1) and of the central post 66 (FIG. 2) to a flange 92 of the cable support 12 by fasteners 90 extending through openings 88, which are provided on the flange 92. The guide recesses 24, better illustrated in FIG. 2, are laterally open to facilitate the installation of the guide column 14, which is U-shaped and, thus, features a loop easily engageable by the user's fingers during the transportation of the cable stripper. The bottoms of the guide recesses and the side holes 88 have a uniform radius and are aligned with one another to ensure that the guide column 14 extends substantially perpendicular to a plane in which the cable support 12 lies.

The carriage 16 carries a blade assembly 18 including a blade positioning dial ring 56 (FIG. 1), which is rotated by the user to establish a desired position corresponding to the desired depth of penetration of the blade into the jacket of the cable to be stripped. The dial ring 56 is operative to rotate to an initial position corresponding to a zero penetration of the blade 70 which is established when the zero "O" mark of the scale formed on the dial ring is juxtaposed with a top edge of index 38 (FIG. 2). A releasable ring lock 30, which is mounted on the side of the blade carriage opposite its flange 22, is operable for locking the dial ring in a position corresponding to the desired penetration of the blade. The ring lock 30 is a spring-biased structure, which, in a normal or locking position, prevents rotation of the dial ring 56, as will be explained below.

A resilient element of the ring lock, such as a spring 32 (FIG. 2), urges the ring lock 30 towards the locking position. The ring lock is substantially a plate-like element having a center recess 31 (FIG. 2) frictionally engaging the dial ring 56 in the locking position of the ring lock 30. In response to an external force, the ring lock 30 can move out of the locking position and release the dial ring 56, so that the latter can be further rotated the desired position corresponding to the selected depth of the blade penetration. Preferably, the index 38 is attached to the ring lock 30 and extends outwards from the blade carriage 16 to terminate flush with the scale for the convenience of the user. The dial ring 56 has a structured surface provided with alternating ribs and troughs slidably engaging a v-shaped edge of the index 38 to indicate the number of turns corresponding to the desired depth of the blade penetration into the cable's jacket. After the desired position has been set, an external force is ceased, and the ring lock returns to its locking position. The sliding motion of the ring lock 30 relative to the guide carriage 16 becomes possible due to a pair of spaced oblong holes 34 (FIG. 2) formed on the ring lock 30 and traversed by fasteners 36, which are removably attached to the blade carriage 16. The fasteners 36 are shaped and dimensioned so as to allow the ring lock's displacement, which is restricted only by the size of the holes.

Turning to FIGS. 4 and 5, the inner end 102 of the blade holder 60 is recessed to receive blade 70 removably attached to the inner end by a fastener and extending substantially flush with the rest of the blade holder. The outer end 64 of the blade holder provides a seat for one end of a spring 62, the other end of spring 62 lodges in a recess 63 (FIG. 3) of blade housing 40 which embraces a flange 44 (FIG. 1) attached to the inner side of the blade carriage 16 so that the spring 62 biases the blade holder 60 away from the cable support 12. The blade housing 40 (FIG. 2), thus, is kept secure by retaining ring 41 (FIG. 2) fitted in a circular groove 43. (FIG. 3) As a consequence, the user applies a force 104 (FIG. 1) overcoming the spring force and sufficient to guide the lever 28 along one of the side channels of the U-shaped guide pocket (FIGS. 3&9) and extending beyond a flange 42 of the blade housing 40 exactly at the desired distance. The blade cap 100 is then screwed in on the blade housing 40 to lock the lever 28 between its inner surface and the opposing surface of the dial ring 56 and remains in this position during the cutting operation. The spring-biased structure of the blade holder allows the user to easily change the current cutting position of the blade 70 between axial and radial cuts without detaching the cable stripper 10.

If a cable to be processed in not round, a wave spring 108 (FIGS. 1&9) keeps the blade support in contact with this cable for constant blade penetration while the entire blade assembly is being adjusted. Axially, the blade assembly 18 is guidable by setting a point screw 57 in an oblong slot 55 (FIG. 3). Also, V-shaped support 12 (FIG. 1) has a plurality of guides 50 raising somewhat above the surface of the support and contributing to a reliable cut regardless of the imperfect shape of the cable to be processed. Finally, V-shaped support 12 may have two halves or a single U-shaped body. Preferably, the body of support 12 include a memory-shaped material providing certain uniformity for cable with uniform diameter.

While this disclosure has described various aspects of the present invention, the latter is not limited thereto, and is susceptible to numerous changes and modifications as known to those skilled in the art. Therefore, the invention is not limited to the details shown and described herein, and includes all such changes and modifications as are encompassed by the scope of the appended claims.

What is claimed is:

1. A cable stripper comprising:
an elongated guide column;
a cable support detachably coupled to one end of the elongated column;
a spring-biased blade carriage slidably mounted on the elongated column and axially movable towards the cable support to engage and press a cable to be processed against the cable support; and
a blade assembly including a blade, the blade assembly being moveable with the blade carriage so that the blade is operable to penetrate a jacket of the cable at a predetermined depth, the blade assembly being configured with
a hollow blade housing mounted on the blade carriage and provided with a periphery, the periphery being configured with a U-shaped guide pocket having two side channels, wherein one side channel of the U-shaped guide pocket is wider than the other side channel of the U-shaped guide pocket,
an elongated blade holder having one end coupled to the blade and an opposing end extending in the hollow blade housing,
a lever coupled to the blade holder and extending transversely therefrom, the lever being operable to move within the blade housing between and within each side channel of the U-shaped guide pocket while the cable is engaged between the blade carriage and the cable support, wherein
the lever is angularly movable within the one side channel of the U-shaped guide pocket at an angle smaller than 90° so as to displace the blade among angular positions, in one of the angular positions the blade being operable to produce one of radial and axial cuts of the jacket and in other angular positions the blade being operable to produce a plurality of spiral cuts of the jacket, and
when displaced into the other side channel of the U-shaped guide pocket the lever being in a single position and the blade being operable to produce the other of the radial and axial cuts of the jacket.

2. The cable stripper according to claim 1, wherein the guide column has a central post provided with a seat on one end and receiving a carriage spring, the carriage spring being braced between the blade carriage and the seat and operative to bias the carriage toward the cable support so as to engage the cable regardless of an outer diameter of the cable.

3. The cable stripper according to claim 1, wherein the one side channel of the U-shaped guide pocket widens towards a bottom thereof which is dimensioned so that the lever is angularly displaceable therealong.

4. The cable stripper according to claim 1, wherein the blade assembly further having a blade spring braced against the blade holder and the blade carriage so as to bias the blade holder away from the cable support.

5. The cable stripper according to claim 4 further comprising a thumb screw traversing and coupling the lever to the blade holder.

6. The cable stripper according the claim 5 further comprising a blade cap having an inner threaded surface engaging a thread on the periphery of the blade housing and displaceable relative to the blade housing so as to lock the lever in a desired position corresponding to one of the radial, spiral and axial cuts by the blade.

7. The cable stripper according to claim 1 further comprising a stop extending through the blade carriage so as to displaceably fix the blade holder in a desired position corresponding to one of the axial, radial and spiral cuts, the blade carriage being further provided with a scale indicating the desired position of the blade holder and a depth of a blade cut.

8. The cable stripper according to claim 1, further comprising a dial assembly rotatably mounted on the blade housing to enable the blade assembly to penetrate the jacket of the cable at the predetermined depth.

9. The cable stripper according to claim 8, wherein the dial assembly includes a dial ring mounted on the blade housing between the blade carriage and a blade cap, so that when the blade cap is displaced toward the dial ring, the lever is locked between opposing faces of the dial ring and the blade cap.

10. The cable stripper according to claim 9, wherein the dial ring has a scale provided on the face of the dial ring facing the blade cap and indicating a desired penetration of the blade into the jacket upon rotating the dial ring in an operative position, the cable stripper further comprising a ring lock mounted on the blade carriage and biased in a lock position, wherein the dial ring is locked against further rotation after having been rotated in the operative position.

11. The cable stripper according to claim 10, wherein the ring lock has a plate-like body formed with spaced oblong holes and extending between opposite ends of the body, one of the ends being provided with a resilient element extending between the blade carriage and the one end, and the other end extending from the blade carriage to terminate flush with the scale and to provide an index for establishing the operative position of the dial ring.

12. The cable stripper according to claim 11, further comprising a plurality of fasteners each extending through a respective one of the spaced oblong holes and removably attached to the blade carriage so that when an external force is applied to the one end of the plate-like body, the ring lock is displaceable until the extremities of the oblong holes engage the fasteners.

13. The cable stripper according to claim 1, further comprising a handle attached to a side of the cable support facing away from the blade carriage, the handle having a point of attachment lying on a central axis which extends through the cable support, the blade carriage and the blade assembly.

14. The cable stripper according to claim 1, wherein the cable support has a body configured with a V-shaped cross-section and having a plurality of pins extending relative to one another so as to define an X, the body being configured from a shape-memory material.

15. A cable stripper comprising:
at least one elongated guide column;
a cable support coupled to the at least one elongated guide column;
a blade carriage mounted on the at least one elongated guide column, the blade carriage and the cable support being spring-biased towards each other so that a cable to be processed is engagable between the cable support and the blade carriage; and
a blade assembly including a blade housing, a blade holder, and a blade, the blade assembly being supported by the blade carriage so as to be operable for the blade to penetrate a jacket of the cable at a predetermined depth, the blade holder and the blade being received within an interior of the blade housing and being axially moveable relative to the blade carriage while the cable is engaged between the blade carriage and the cable support, the blade holder and the blade also being rotationally moveable between a plurality of positions relative to the blade carriage while the cable is engaged between the blade carriage and the cable support, the plurality of positions being operable for the blade to produce cuts in a jacket of the cable corresponding to a radial cut, a plurality of spiral cuts and an axial cut, the plurality of positions corresponding to the radial cut, the plurality of spiral cuts and the axial cut defining an angular rotation of the blade holder and the blade of about 90 degrees.

16. The cable stripper according to claim 15, wherein the at least one elongated guide column defines a longitudinal axis and the cable support defines a receiving space configured to receive the cable along an axis transverse to the longitudinal axis.

17. The cable stripper according to claim 16, wherein the blade holder and the blade are axially movable along an axis generally parallel to the longitudinal axis of the at least one elongated guide column.

18. The cable stripper according to claim 16, wherein the blade holder and the blade housing are rotationally movable about an axis generally parallel to the longitudinal axis of the at least one elongated guide column.

19. The cable stripper according to claim 15, wherein the at least one elongated guide column includes two elongated guide columns.

20. The cable stripper according to claim 19, wherein the cable support and the blade carriage are biased towards each other by a spring, the spring being located between the two elongated guide columns.

21. The cable stripper according to claim 15, wherein the cable support and the blade carriage are biased towards each other by a spring.

22. The cable stripper according to claim 15, further comprising a dial assembly rotatably mounted and coupled to the blade housing to enable the blade assembly to penetrate the jacket of the cable at the predetermined depth.

* * * * *